US012431810B2

(12) United States Patent
Chen et al.

(10) Patent No.: US 12,431,810 B2
(45) Date of Patent: Sep. 30, 2025

(54) ISOLATED SWITCHING CONVERTER FOR PEAK POWER DEMAND AND CONTROL METHOD THEREOF

(71) Applicant: Hangzhou MPS Semiconductor Technology, Ltd., Hangzhou (CN)

(72) Inventors: Xuefeng Chen, Hangzhou (CN); Xia Zhou, Hangzhou (CN); Hui Li, Hangzhou (CN)

(73) Assignee: Hangzhou MPS Semiconductor Technology, Ltd., Zhejiang (CN)

( * ) Notice: Subject to any disclaimer, the term of this patent is extended or adjusted under 35 U.S.C. 154(b) by 245 days.

(21) Appl. No.: 18/471,473

(22) Filed: Sep. 21, 2023

(65) Prior Publication Data

US 2024/0113629 A1 Apr. 4, 2024

(30) Foreign Application Priority Data

Sep. 29, 2022 (CN) .......................... 202211205923.1

(51) Int. Cl.
*H02M 3/335* (2006.01)
*H02M 1/00* (2006.01)

(52) U.S. Cl.
CPC ..... *H02M 3/33507* (2013.01); *H02M 1/0009* (2021.05)

(58) Field of Classification Search
CPC ........... H02M 3/33507; H02M 1/0009; H02M 1/0058; H02M 3/33592; H02M 3/33523; H02M 3/33576; H02M 1/0025; H02M 1/088

See application file for complete search history.

(56) References Cited

U.S. PATENT DOCUMENTS

| | | | | |
|---|---|---|---|---|
| 8,976,547 B2 * | 3/2015 | Ren | .......................... | H02M 1/32 363/21.14 |
| 9,407,151 B2 * | 8/2016 | Zhang | ................ | H02M 3/33507 |
| 2013/0301311 A1 * | 11/2013 | Wang | ................ | H02M 3/33515 363/21.13 |
| 2015/0103567 A1 * | 4/2015 | Wang | ................ | H02M 3/33592 363/21.13 |
| 2015/0207420 A1 * | 7/2015 | Wang | ................ | H02M 3/33507 363/21.12 |
| 2022/0103078 A1 | 3/2022 | Fan et al. | | |
| 2022/0209665 A1 | 6/2022 | Li et al. | | |

(Continued)

*Primary Examiner* — Kyle J Moody
(74) *Attorney, Agent, or Firm* — Perkins Coie LLP

(57) ABSTRACT

A controller used in an isolated switching converter. The controller has an error amplifying circuit for generating a first compensation signal based on the difference between an output feedback signal and a reference voltage, a control generator for generating a first and second control signals based on the first compensation signal, an isolation circuit for providing a first synchronous signal electrically isolated from the first control signal and a second synchronous signal electrically isolated from the second control signal, an upper threshold generator for providing an upper threshold voltage, and a peak current generator for providing a peak current signal for controlling a peak value of a current flowing through the primary switch based on the first synchronous signal, the second synchronous signal and the upper threshold voltage. The upper threshold voltage is adjusted above a first upper threshold voltage when a peak power demand is made.

20 Claims, 7 Drawing Sheets

(56) References Cited

U.S. PATENT DOCUMENTS

| | | |
|---|---|---|
| 2022/0209676 A1 | 6/2022 | Li et al. |
| 2023/0188033 A1 | 6/2023 | Chen et al. |
| 2023/0188046 A1 | 6/2023 | Chen et al. |
| 2024/0039417 A1* | 2/2024 | Chen ................ H02M 3/33523 |

* cited by examiner

ISOLATED SWITCHING CONVERTER FOR PEAK POWER DEMAND AND CONTROL METHOD THEREOF

CROSS-REFERENCE TO RELATED APPLICATIONS

This application claims the benefit of CN application 202211205923.1, filed on Sep. 29, 2022, and incorporated herein by reference.

TECHNICAL FIELD OF THE INVENTION

The present invention generally relates to electronic circuits, and more particularly but not exclusively, to isolated switching converters with quasi-resonant control and associated control methods to meet peak power demand.

BACKGROUND OF THE INVENTION

Many loads, such as printers or scanners, have varied power demands depending on the particular function being performed. Most of the functions have low to mid power demands and can be performed by the conventional isolated switching converters. Such low to mid power demand functions is referred to as normal operation. Some functions, such as the paper scrolling function of a printer that requires the use of a motor, have a high or peak power demands that exceeds the effective range of the conventional isolated switching converter with normal operation. For such peak power demand made by the load, it is desired to provide an improved isolated switching converter, to meet both normal operation and peak power operation.

SUMMARY OF THE INVENTION

An embodiment of the present invention discloses a controller used in an isolated switching converter, the switching converter has a transformer and a primary switch. The controller comprises an error amplifying circuit, a control generator, an isolation circuit, an upper threshold generator, a peak current generator and a peak comparison circuit. The error amplifying circuit is configured to receive an output feedback signal indicative of an output signal of the isolated switching converter, wherein based on the difference between the output feedback signal and a reference voltage, the error amplifying circuit provides a first compensation signal. The control generator is configured to respectively generate a first control signal and a second control signal based on the first compensation signal. The isolation circuit has a first channel to transmit the first control signal and a second channel to transmit the second control signal, and further has a first output terminal for providing a first synchronous signal electrically isolated from the first control signal and a second output terminal for providing a second synchronous signal electrically isolated from the second control signal. The upper threshold generator is configured to provide an upper threshold voltage, wherein the upper threshold voltage is adjusted above a first upper threshold voltage when a peak power demand is made. The peak current generator is configured to provide a peak current signal at an output terminal based on the first synchronous signal, the second synchronous signal and the upper threshold voltage. The peak comparison circuit is configured to compare a current sense signal indicative of a current flowing through the primary switch with the peak current signal and to provide a turning-off control signal for turning-off the primary switch.

Another embodiment of the present invention discloses an isolated switching converter. The switching converter comprises a transformer, a primary switch and a controller. The controller comprises an error amplifying circuit, a control generator, an isolation circuit, an upper threshold generator, a peak current generator and a peak comparison circuit. The error amplifying circuit is configured to receive an output feedback signal indicative of an output signal of the isolated switching converter, wherein based on the difference between the output feedback signal and a reference voltage, the error amplifying circuit provides a first compensation signal. The control generator is configured to respectively generate a first control signal and a second control signal based on the first compensation signal. The isolation circuit has a first channel to transmit the first control signal and a second channel to transmit the second control signal, and further has a first output terminal for providing a first synchronous signal electrically isolated from the first control signal and a second output terminal for providing a second synchronous signal electrically isolated from the second control signal. The upper threshold generator is configured to provide an upper threshold voltage, wherein the upper threshold voltage is adjusted above a first upper threshold voltage when a peak power demand is made. The peak current generator is configured to provide a peak current signal at an output terminal based on the first synchronous signal, the second synchronous signal and the upper threshold voltage. The peak comparison circuit is configured to compare a current sense signal indicative of a current flowing through the primary switch with the peak current signal and to provide a turning-off control signal for turning-off the primary switch.

Yet another embodiment of the present invention discloses a control method used in an isolated switching converter. The switching converter has a primary switch and an isolation circuit. The control method comprises the following steps: an output feedback signal indicative of an output signal of the isolated switching converter is provided. Based on the difference between the output feedback signal and a reference voltage, a first compensation signal is provided. Based on the first compensation signal, a first control signal and a second control signal are generated. The first control signal is transmitted to a first channel of the isolation circuit to provide a first synchronous signal electrically isolated from the first control signal. The second control signal is transmitted a second channel of the isolation circuit to provide a second synchronous signal electrically isolated from the second control signal. An upper threshold voltage is provided, and wherein the upper threshold voltage is above a first upper threshold voltage when a peak power demand is made. A peak current signal is generated based on the first synchronous signal, the second synchronous signal and the upper threshold voltage. A turning-off control signal for turning-off the primary switch is generated based on a current sense signal indicative of the current flowing through the primary switch and the peak current signal.

BRIEF DESCRIPTION OF DRAWINGS

The present invention can be further understood with reference to the following detailed description and the appended drawings, wherein like elements are provided with like reference numerals.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element.

The present invention can be used in any isolated switching converter. In the following detailed description, for the sake of brevity, only a flyback converter is taken as an example to explain and describe the working principle of the present invention.

Figure 1:
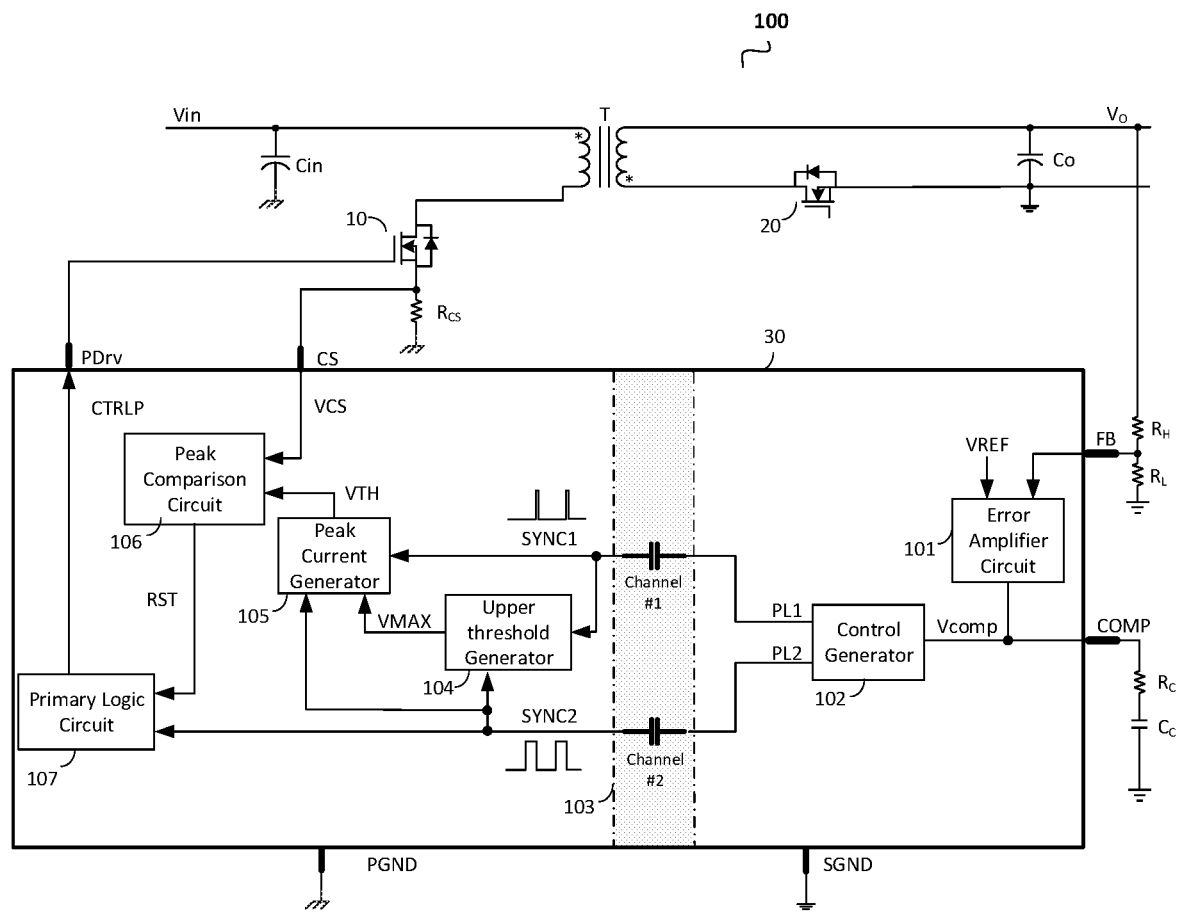
FIG. 1 shows a block diagram of an isolated switching converter 100 in accordance with an embodiment of the present invention.

FIG. 1 shows a block diagram of an isolated switching converter 100 in accordance with an embodiment of the present invention. As shown in FIG. 1, the isolated switching converter 100 comprises a transformer T, a primary switch 10, a secondary switch 20 and a controller 30. The transformer T providing isolation between a primary side and a secondary side, has a primary winding, a secondary winding and an auxiliary winding. The primary winding and the secondary winding both have a first terminal and a second terminal. The first terminal of the primary winding receives an input voltage Vin, the first terminal of the secondary winding provides a DC output voltage Vo, and the second terminal of the secondary winding is coupled to a secondary reference ground. The primary switch 10 is coupled between the second terminal of the primary winding and a primary reference ground. The secondary switch 20 is coupled between the second terminal of the secondary winding and a load. However, those skilled in the art should know that the secondary switch 20 may also be coupled between the first terminal of the secondary winding and the load.

In the embodiment shown in FIG. 1, the controller 30 of the switching converter 100 uses quasi-resonant control. The switching converter 100 with quasi-resonant control works under discontinuous current mode, which means once a current flowing through an energy storage component (e.g., the transformer T) reaches zero, the energy storage component begin to resonate with the parasitic capacitance of the primary switch 10, and thus a resonant voltage is generated. The primary switch 10 is turned on when a voltage across the primary switch 10 reaches its resonant valley (valley point of the voltage during resonance) which is called valley switching, so as to reduce the switching loss and EMI.

As shown in FIG. 1, the controller 30 comprises an error amplifying circuit 101, a control generator 102, an isolation circuit 103, an upper threshold generator 104, a peak current generator 105, a peak comparison circuit 106 and a primary logic circuit 107. In one embodiment, the controller 30 and the secondary switch 20 are integrated into a monolithic chip and provides a driver circuit for the secondary switch 20.

In the example shown in FIG. 1, the controller 30 comprises a plurality of pins including an output feedback pin FB, a compensation pin COMP, a secondary reference ground pin SGND, a primary reference ground pin PGND, a primary current sense pin CS and a primary control pin PDrv.

As shown in FIG. 1, the error amplifying circuit 101 has a first input terminal, a second input terminal and an output terminal, wherein the first input terminal is coupled to the output feedback pin FB to receive an output feedback signal VFB indicative of an output signal (e.g., the output voltage Vo) of the isolated switching converter 100, the second input terminal is configured to receive a reference voltage VREF, and the output terminal is coupled to the compensation pin COMP.

In the example shown in FIG. 1, a resistor divider is coupled between the output voltage Vo and the output feedback pin FB of the controller 30, to sample the output voltage Vo of the switching converter 100 for providing the output feedback signal VFB. The error amplifying circuit 101 is coupled between the output feedback pin FB and the compensation pin COMP, and generates a first compensation signal Vcomp at the output terminal based on the difference between the output feedback signal VFB and the reference voltage VREF. The control generator 102 is coupled to the compensation pin COMP to receive the first compensation signal Vcomp, and respectively provides a first control signal PL1 and a second control signal PL2 for controlling a current threshold voltage VTH and a switching frequency of the primary switch 10.

The isolation circuit 103 has a first channel to transmit the first control signal PL1 and a second channel to transmit the second control signal PL2, and further has a first output terminal for providing a first synchronous signal SYNC1 electrically isolated from the first control signal PL1 and a second output terminal for providing a second synchronous signal SYNC2 electrically isolated from the second control signal PL2. In one embodiment, the isolation circuit 103 may comprise opto-coupler, transformer, capacitor or any other suitable electrical isolation device. In other embodiments, the isolation circuit 103 may be located outside of the controller 30.

As shown in FIG. 1, the upper threshold generator 104 has a first input terminal, a second input terminal and an output terminal, wherein the first input terminal is coupled to the first output terminal of the isolation circuit 103 to receive the first synchronous signal SYNC1, the second input terminal is coupled to the second output terminal of the isolation circuit 103 to receive the second synchronous signal SYNC2. Based on the first synchronous signal SYNC1 and the second synchronous signal SYNC2, the upper threshold generator 104 provides an upper threshold voltage VMAX at the output terminal. When a peak power demand is made by the load or by a user, the upper threshold voltage VMAX is adjusted above a first upper threshold voltage VMX1.

The peak current generator 105 has a first input terminal, a second input terminal, a third input terminal and an output terminal, wherein the first input terminal is coupled to the first output terminal of the isolation circuit 103 to receive the first synchronous signal SYNC1, the second input terminal is coupled to the second output terminal of the isolation circuit 103 to receive the second synchronous signal SYNC2, the third input terminal is coupled to the output terminal of the upper threshold generator 104 to receive the upper threshold voltage VMAX. Based on the first synchronous signal SYNC1, the second synchronous signal SYNC2, and the upper threshold voltage VMAX, the peak current generator 105 provides a peak current signal VTH at the output terminal.

In one embodiment, the controller 30 further comprises a buffer circuit. The buffer circuit is coupled between the output terminal of the upper threshold generator 104 and the third input terminal of the peak current generator 105, to isolate and buffer the upper threshold voltage VMAX.

The peak comparison circuit 106 has a first input terminal, a second input terminal, and an output terminal, wherein the first input terminal is coupled to the primary current sense pin CS to receive a current sense signal VCS indicative of a current flowing through the primary switch 10. The second input terminal of the peak comparison circuit 106 is coupled to the output terminal of the peak current generator 105 to receive the peak current signal VTH. The peak comparison circuit 106 compares the current sense signal VCS with the peak current signal VTH, and provides a turning-off control signal RST for controlling the turning-off of the primary switch 10. The primary logic circuit 107 provides a primary control signal CTRLP at an output terminal to a control terminal of the primary switch 10 through the primary control pin PDrv, for controlling the primary switch 10. In one embodiment, when the second synchronous signal SYNC2 comes and a resonant voltage across the primary switch 10 reaches its minimum values, i.e., valley, the primary switch 10 is turned on.

Figure 2:
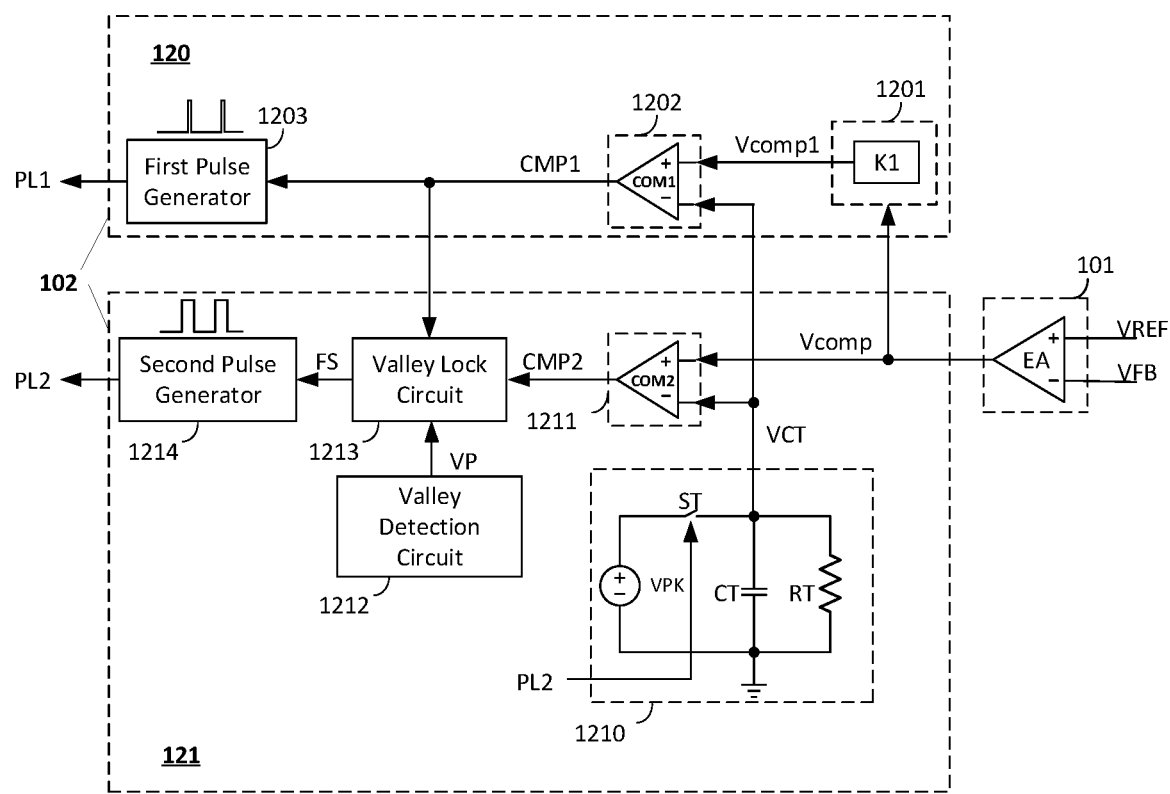
FIG. 2 shows a schematic diagram of an error amplifying circuit 101 and a control generator 102 in accordance with an embodiment of the present invention.

FIG. 2 shows a schematic diagram of an error amplifying circuit 101 and a control generator 102 in accordance with an embodiment of the present invention. In the example shown in FIG. 2, the error amplifying circuit 101 comprises an error amplifier EA. The inverting input terminal of the error amplifier EA is configured to receive the output feedback signal FB indicative of the output voltage Vo of the switching converter, the non-inverting input terminal is configured to receive the reference voltage VREF, the output terminal is configured to provide the first compensation signal Vcomp.

In the example shown in FIG. 2, the control generator 102 comprises a first control signal generator 120 and the second control signal generator 121. As shown in FIG. 2, the first control signal generator 121 comprises a hysteresis compensation circuit 1201, a first comparison circuit 1202 and a first pulse generator 1203. The hysteresis compensation circuit 1201 is coupled to the output terminal of the error amplifying circuit 101 to receive the first compensation signal Vcomp, and provides a second compensation signal Vcomp1 at an output terminal. In one embodiment, the hysteresis compensation circuit 1201 adds a hysteresis signal onto the first compensation signal Vcomp, to generate the second compensation signal Vcomp1. In another embodiment, the second compensation signal Vomp1 is proportional to the first compensation signal Vcomp, and the proportional coefficient is K1. In one embodiment, K1 is higher than 1.

The first comparison circuit 1202 is coupled to the output terminal of the hysteresis compensation circuit 1201 to receive the second compensation signal Vcomp1, and is also coupled to an output terminal of a modulation generator 1201 to receive a modulation signal VCT. The first comparison circuit 1202 compares the second compensation signal Vcomp1 with the modulation signal VCT, and provides a first comparison signal CMP1 at an output terminal. The first pulse generator 1203 is configured to receive the first comparison signal CMP1, and provides a first control signal PL1 in the form of pulses at an output terminal, for transmitting to the primary side through the first channel of the isolation circuit 103, and to control the current threshold voltage VTH.

In the example shown in FIG. 2, the modulation generator 1210 comprises a voltage source VPK, a switch ST, a capacitor CT and a resistor RT. As shown in FIG. 2, the voltage source VPK has a positive terminal and a negative terminal, wherein the negative terminal is coupled to the secondary reference ground. The switch ST has a first terminal, a second terminal and a control terminal, wherein the first terminal is coupled to the positive terminal of the voltage source VPK, the control terminal is configured to receive the second control signal PL2. The capacitor CT has a first terminal and a second terminal, wherein the first terminal is coupled to the second terminal of the switch ST, the second terminal is coupled to the secondary reference ground. The resistor RT has a first terminal and a second terminal, wherein the first terminal is coupled to the first terminal of the capacitor CT, the second terminal is coupled to the secondary reference ground. The modulation signal VCT is generated at the first terminal of the capacitor CT. When the second control signal PL2 is activated, the modulation signal VCT is pulled up to a peak voltage, then begins to decrease until the second control signal PL2 is activated again.

In the example shown in FIG. 2, the second control signal generator 121 comprises a second comparison circuit 1211, a valley detection circuit 1212, a valley lock circuit 1213 and a second pulse generator 1214. The second comparison circuit 1211 is coupled to the output terminal of the error amplifying circuit 101 to receive the first compensation signal Vcomp, and is further coupled to the modulation generator 1210 to receive the modulation signal VCT. The second comparison circuit 1211 compares the modulation signal VCT with the first compensation signal Vcomp, and provides a second comparison signal CMP2 at an output terminal. The second comparison circuit 1211 comprises a comparator COM2. The non-inverting input terminal of the comparator COM2 is coupled to receive the first compensation signal Vcomp, the inverting input terminal of the comparator COM2 is coupled to the first terminal of the capacitor CT to receive the modulation signal VCT. The comparator COM2 provides the second comparison signal CMP2 at the output terminal.

The valley detection circuit 1212 is configured to detect one or more valleys of a voltage drop across the secondary switch 20 during the OFF state of the secondary switch 20 and generate a valley pulse signal VP at an output terminal. In one embodiment, the valley detection circuit 1212 is configured to detect if the voltage across the secondary switch 20 is less than a valley threshold signal, and provides the valley pulse signal VP based on the detection.

The valley lock circuit 1213 is configured to receive the first comparison signal CMP1, the second comparison signal CMP2, and the valley pulse signal VP. Based on the first comparison signal CMP1, the second comparison signal CMP2, the valley pulse signal VP and a current locked valley number V_LOCK(n−1), the valley lock circuit 1213 determines a target locked valley number V_LOCK(n) for next turning-on, and further provides a frequency control signal FS corresponding to the target valley number V_LOCK(n) at an output terminal, for controlling the switching frequency of the primary switch 10.

In one embodiment, the valley lock circuit 1213 is configured compare a first designated valley number when the modulation signal VCT reaches the second compensation signal Vcomp1 with the current locked valley number V_LOCK(n−1), to determine whether to increase the target locked valley number V_LOCK(n). The valley lock circuit 1213 is configured compare a second designated valley number when the modulation signal VCT reaches the first compensation signal Vcomp with the current locked valley number V_LOCK(n−1), to determine whether to decrease the target locked valley number V_LOCK(n).

The second pulse generator 1214 receives the frequency control signal FS, and provides the second control signal PL2 in the form of pulses at an output terminal, for transmitting to the primary side through the second channel of the isolation circuit 103, to control the switching frequency and valley switching of the primary switch 10.

Figure 3:
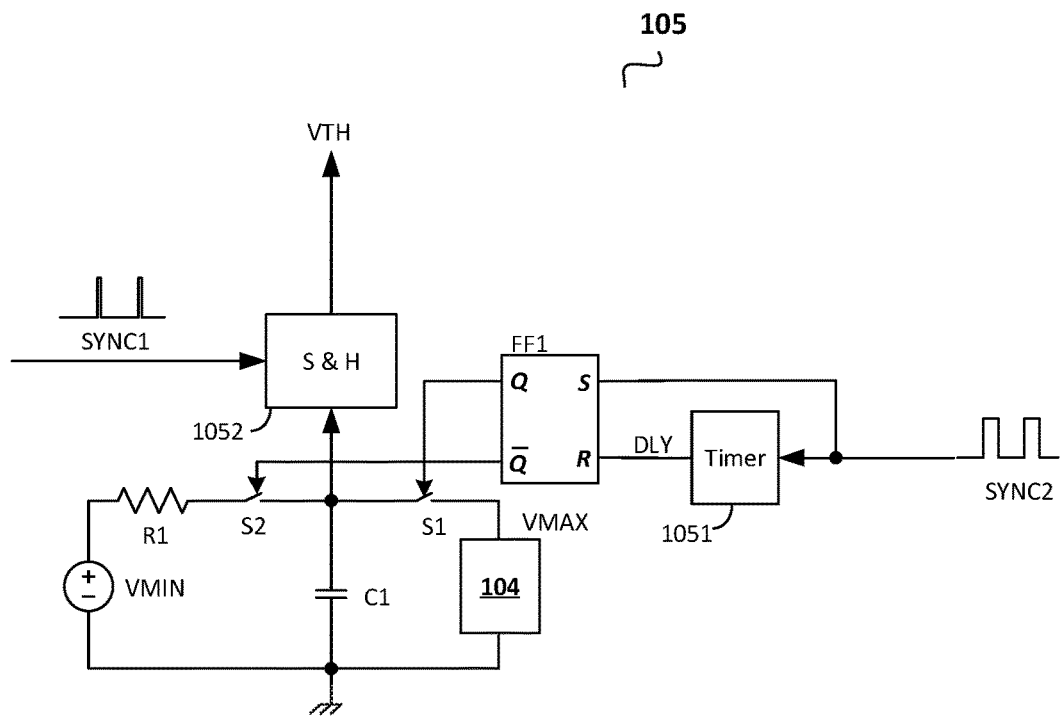
FIG. 3 shows a schematic diagram of a peak current generator 105 in accordance with an embodiment of the present invention.

FIG. 3 shows a schematic diagram of a peak current generator 105 in accordance with an embodiment of the present invention. As shown in FIG. 3, the peak current generator 105 comprises a first capacitor C1. When a rising edge of the second synchronous signal SYNC2 comes, a voltage VC1 across the first capacitor C1 is set high to the upper threshold voltage VMAX, and then the voltage VC1 starts to decrease with a time constant, and when the first synchronous signal SYNC1 comes, the voltage VC1 is sampled and held as the peak current signal VTH.

In the example shown in FIG. 3, the peak current generator 105 further comprises a timer circuit 1051, a flip-flop FF1, a voltage source VMIN, a first switch S1, a second switch S2, a resistor R1 and a sample-and-hold circuit 1052. In the example shown in FIG. 3, the timer circuit 1051 has an input terminal and an output terminal, wherein the input terminal is coupled to the second output terminal of the isolation circuit 103 to receive the second synchronous signal SYNC2. Based on the second synchronous signal SYNC2, the timer circuit 1051 provides a timing signal DLY at the output terminal. The flip-flop FF1 has a set terminal, a reset terminal, an output terminal and an inverting output terminal, wherein the set terminal is coupled to receive the second synchronous signal SYNC2, the reset terminal is coupled to the output terminal of the timer circuit 1051 for receiving the timing signal DLY. The voltage source VMIN has a positive terminal, and a negative terminal coupled to the primary reference ground. The first switch S1 has a first terminal, a second terminal and a control terminal, wherein the first terminal is coupled to the first terminal of the first capacitor C1, and the second terminal is coupled to the output terminal of the upper threshold generator 104 to receive the upper threshold voltage VMAX, and the control terminal is coupled to the output terminal of the flip-flop FF1. The second switch S2 has a first terminal, a second terminal and a control terminal, wherein the first terminal is coupled to the first terminal of the first capacitor C1, the second terminal is coupled to the positive terminal of the voltage source VMIN through the resistor R1, and the control terminal is coupled to the inverting output terminal of the flip-flop FF1.

The sample-and-hold circuit 1052 has a first input terminal, a second input terminal and an output terminal, wherein the first input terminal is coupled to the first output terminal of the isolation circuit 103 to receive the first synchronous signal SYNC1, the second input terminal is coupled to the first terminal of the first capacitor C1 to receive the voltage VC1 across the first capacitor C1. The sample-and-hold circuit 1052 is configured to provide the peak current signal VTH at the output terminal by sampling and holding the voltage VC1 across the first capacitor C1 based on the first synchronous signal SYNC1.

Figure 4:
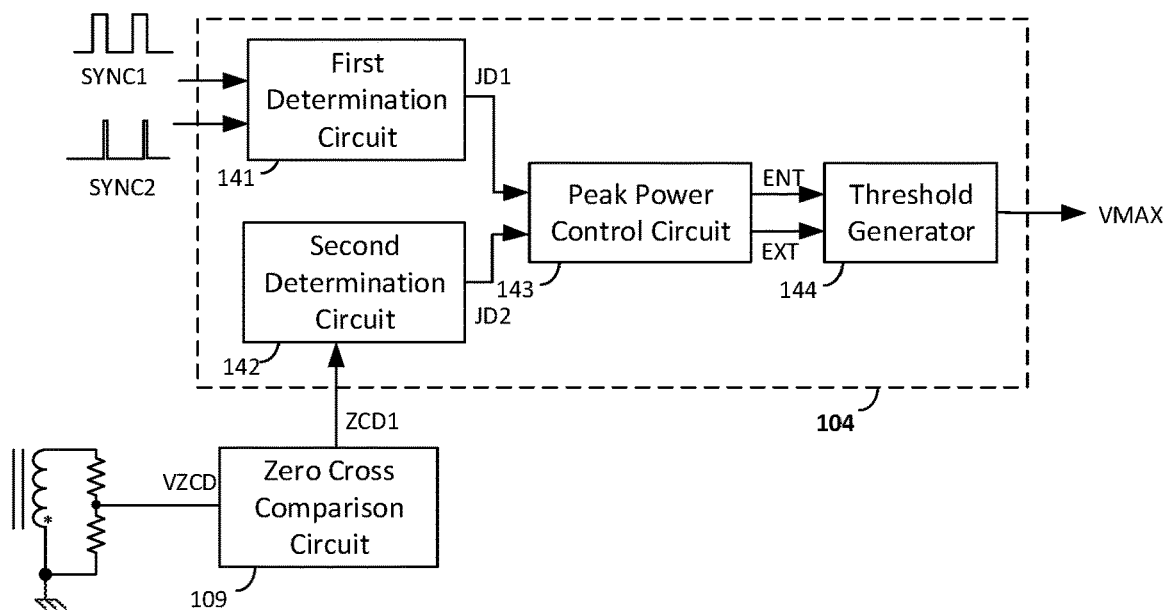
FIG. 4 shows a schematic diagram of an upper threshold generator 104 in accordance with an embodiment of the present invention.

FIG. 4 shows a schematic diagram of an upper threshold generator 104 in accordance with an embodiment of the present invention. In the example shown in FIG. 4, the transformer T has an auxiliary winding having a first terminal and a second terminal, wherein the second terminal of the auxiliary winding is coupled to the primary reference ground.

In the example shown in FIG. 4, the switching converter further comprises a zero-cross comparison circuit 109 configured to detect if a resonant voltage across the primary switch 10 reaches its minimum values, i.e., valleys. In one embodiment, the zero-cross comparison circuit 109 compares a zero-crossing detection signal VZCD and a zero-crossing threshold voltage VZCD_TH, and provides a zero-crossing signal ZCD1 at an output terminal.

As shown in FIG. 4, the upper threshold generator 104 comprises a first determination circuit 141, a second determination circuit 142, a peak power control circuit 143 and a threshold generator 144. The first determination circuit 141 is configured to receive the first synchronous signal SYNC1 and the second synchronous signal SYNC2, provides a first determination signal JD1 by determining whether a time interval between the first synchronous signal SYNC1 and the second synchronous signal SYNC2 is less than a first time duration. The second determination circuit 142 is configured to receive the zero-crossing signal ZCD1, and provides a second determination signal JD2 by determining whether the primary switch 10 is locked and turned on at a first valley. The peak power control circuit 143 is configured to provide an enter control signal ENT and an exit control signal EXT to determine whether to enter or exit a state where the upper threshold voltage VMAX is above the first upper threshold VMX1.

Figure 5:
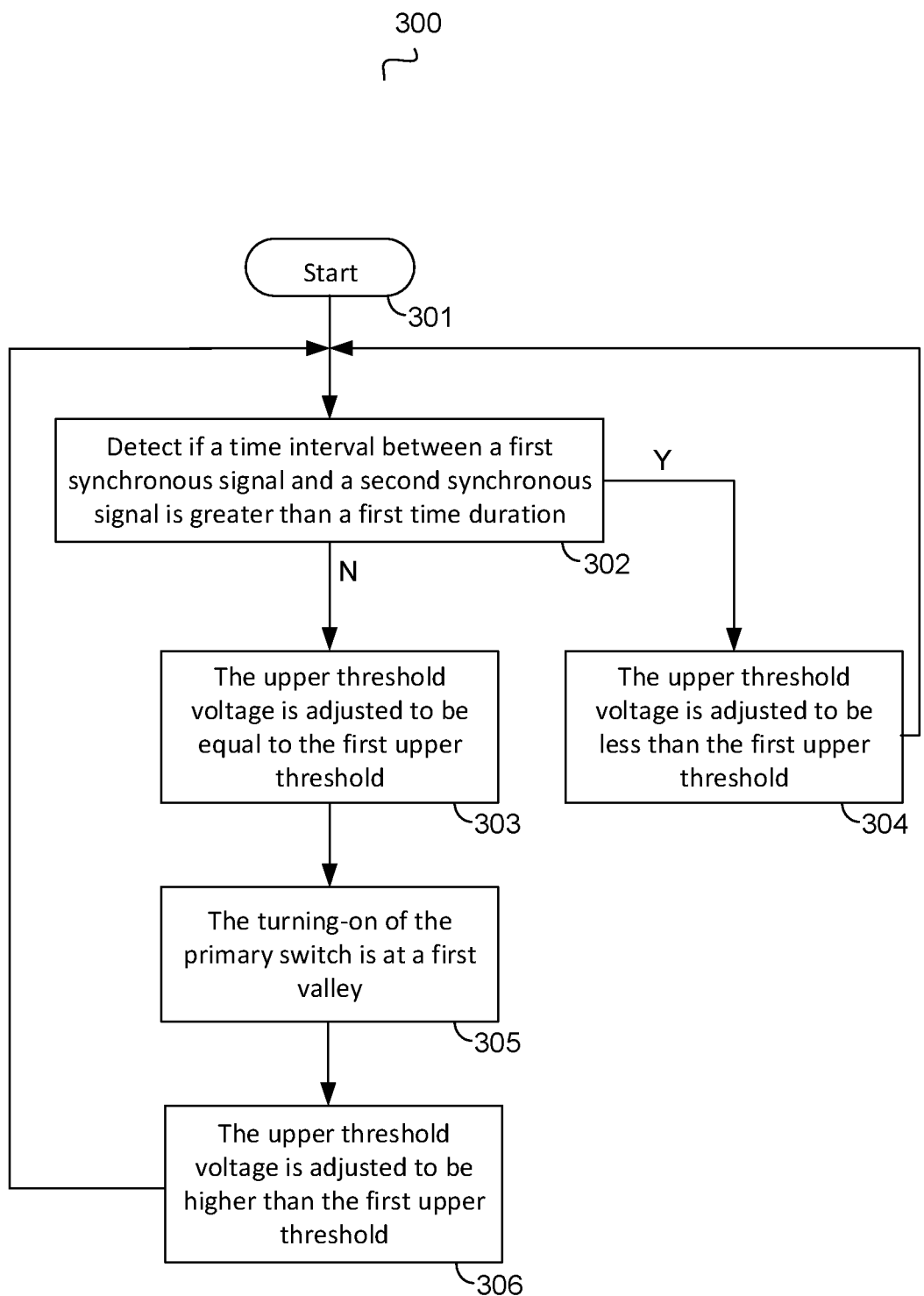
FIG. 5 shows a flow diagram of an adjusting method 300 for the upper threshold voltage in accordance with an embodiment of the present invention.

FIG. 5 shows a flow diagram of an adjusting method 300 for the upper threshold voltage in accordance with an embodiment of the present invention. The adjusting method 300 of the upper threshold voltage VMAX comprises steps 301~306.

At step 301, the first synchronous signal SYNC1 and the second synchronous signal SYNC2 are received on the primary side via the isolation circuit.

At step 302, whether a time interval between the first synchronous signal and the second synchronous signal is less than a first time duration is determined. If yes, go step 304. At step 304, limiting or adjusting the upper threshold voltage VMAX below the first upper threshold voltage VMX1.

At step 303, when the time interval between the first synchronous signal SYNC1 and the second synchronous signal SYNC2 is less than the first time duration, the upper threshold voltage VMAX is adjusted to be equal to the first upper threshold voltage VMX1. At step 305, whether the primary switch is turned on at the first valley is detected. When the turning-on of the primary switch 10 is locked at the first valley and the upper threshold voltage VMAX reaches the first upper threshold voltage VMX1, the process enters step 306, the upper threshold voltage VMAX is adjusted above the first upper threshold voltage VMX1. Then return to the step 301 and continue to detect.

Figure 6:
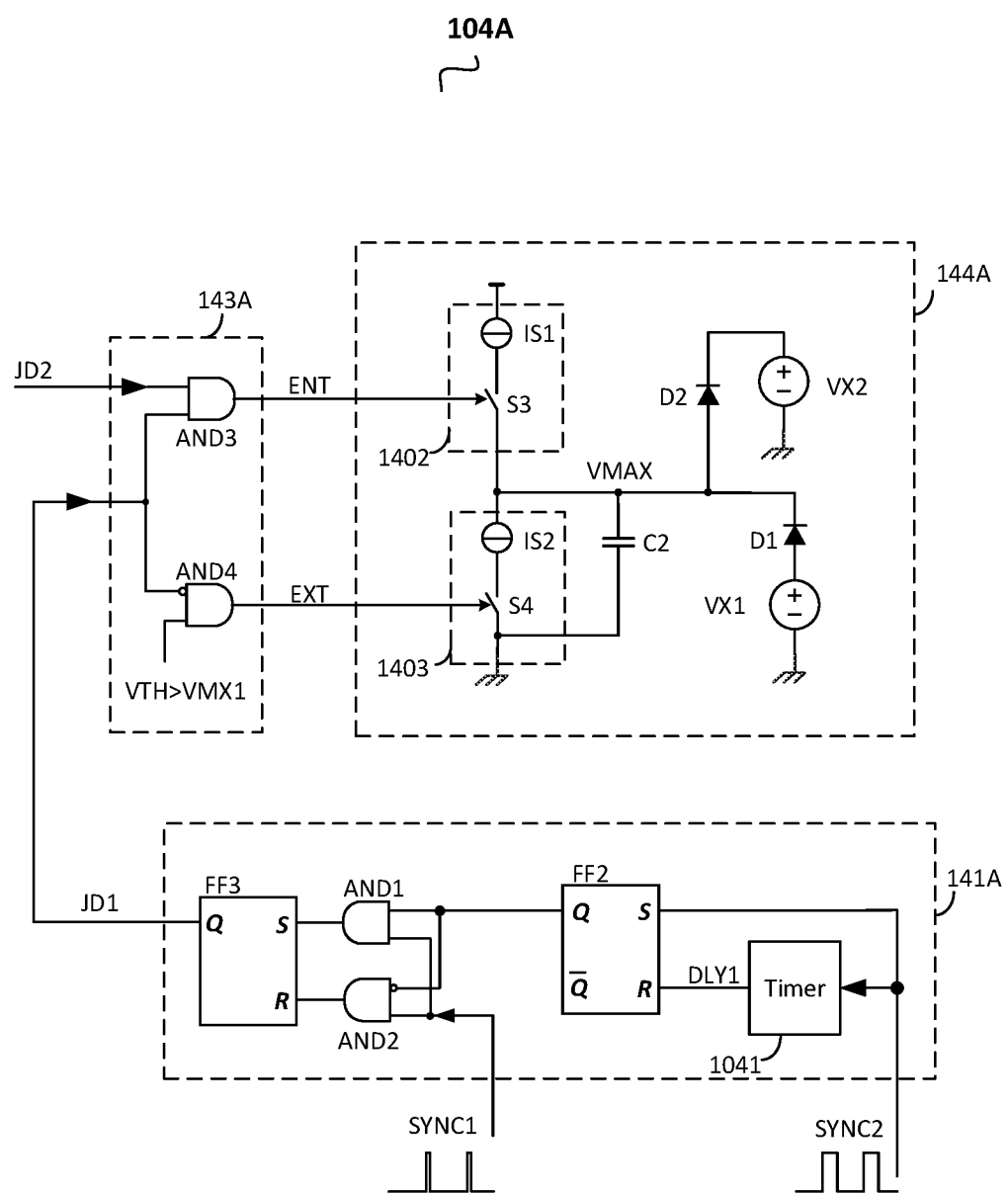
FIG. 6 shows an upper threshold generator 104A in accordance with an embodiment of the present invention.

FIG. 6 shows an upper threshold generator 104A in accordance with an embodiment of the present invention. In the example shown in FIG. 6, the upper threshold voltage 104A comprises a first determination circuit 141A, a peak power control circuit 143A and a threshold generator 144A.

In the example shown in FIG. 6, the first determination circuit 141 comprises a timer circuit FF2, a flip-flop FF2, a first AND gate circuit AND1, a second AND gate circuit AND2, and a flip-flop FF3. The timer circuit 1041 has an input terminal and an output terminal, wherein the input terminal is coupled to the second output terminal of the isolation circuit 103 to receive the second synchronous signal SYNC2. Based the second synchronous signal SYNC2, the timer circuit 1041 provides a timing signal DLY1 at the output terminal. The flip-flop FF2 has a set terminal, a reset terminal and an output terminal, wherein the set terminal is coupled to receive the second synchronous signal SYNC2, the reset terminal is coupled to the output terminal of the timer circuit 1041 for receiving the timing signal DLY1. In one embodiment, the first determination circuit 141A may omit the timing circuit 1041 and the flip-flop FF2 and directly reuse the timing circuit 1051 and the flip-flop FF1 in FIG. 3.

The first AND gate circuit AND1 has a first input terminal, a second input terminal and an output terminal, wherein the first input terminal is coupled to the output terminal of the flip-flop FF2, and the second input terminal is configured to receive the first synchronous signal SYNC1. The second AND gate circuit AND2 has a first inverting input terminal, a second input terminal and an output terminal, wherein the first inverting input terminal is coupled to the output terminal of the flip-flop FF2, the second input terminal is configured to receive the first synchronous signal SYNC1. The flip-flop FF3 has a set terminal, a reset terminal and an output terminal, wherein the set terminal is coupled to the output terminal of the first AND gate circuit AND1, the reset terminal is coupled to the output terminal of the second AND gate circuit AND2, and provides the first determination signal JD1 at the out put terminal.

The peak power control circuit comprises a third AND gate circuit AND3 and a fourth AND gate circuit AND4. The third AND gate circuit AND3 has a first input terminal, a second input terminal and an output terminal, wherein the first input terminal is coupled to the output terminal of the first determination circuit 141A to receive the first determination signal JD1, the second input terminal is coupled to the output terminal of the second determination circuit 142 to receive the second determination signal JD2, and the output terminal is configured to provide an enter control signal ENT. When the enter control signal is activated, the upper threshold voltage VMAX is adjusted to increase and the upper threshold voltage VMAX enters a state where the upper threshold voltage VMAX is above the first upper threshold VMX1. The fourth AND gate circuit AND4 has a first inverting input terminal, a second input terminal and an output terminal, wherein the first inverting input terminal is configured to receive the first determination signal JD1, the second input terminal is configured to receive a flag signal which indicates the state where the upper threshold voltage VMAX is above the first upper threshold VMX1. The fourth AND gate circuit AND4 provides an exit control signal EXT at the output terminal. When the exit control signal EXT is activated, the upper threshold voltage VMAX is adjusted to decrease, the state where the upper threshold voltage VMAX is above the first upper threshold VMX1 is exited.

In the example shown in FIG. 6, the threshold generator 144A comprises a second capacitor C2, a second voltage source VX1, a third voltage source VX3, a first diode D1, a second diode D2, a charging control unit 1402 and a discharging control unit 1403. The second capacitor C2 has a first terminal and a second terminal, wherein the first terminal is configured to provide the upper threshold voltage VMAX, the second terminal is coupled to the primary reference ground. The second voltage source VX1 has a positive terminal and a negative terminal, wherein the negative terminal is coupled to the primary reference ground. The third voltage source VX2 has a positive terminal and a negative terminal, wherein the negative terminal is coupled to the primary reference ground. The first diode D1 has an anode and a cathode, wherein the anode is coupled to the positive terminal of the second voltage source VX1, and the cathode is coupled to the first terminal of the second capacitor C2. The second diode D2 has an anode and a cathode, wherein the anode is coupled to the first terminal of the second capacitor C2, and the cathode is coupled to the positive terminal of the third voltage source VX2. The charging control unit 1402 comprises a charging current source IS1 and a control switch S3, and is configured to charge the second capacitor C2 with the charging current source IS1 based on the enter control signal ENT. The discharging control unit 1403 comprises a discharging current source IS2 and a control switch S4 and is configured to discharge the second capacitor C2 with the discharging current source IS2 based on the exit control signal EXT.

Figure 7:
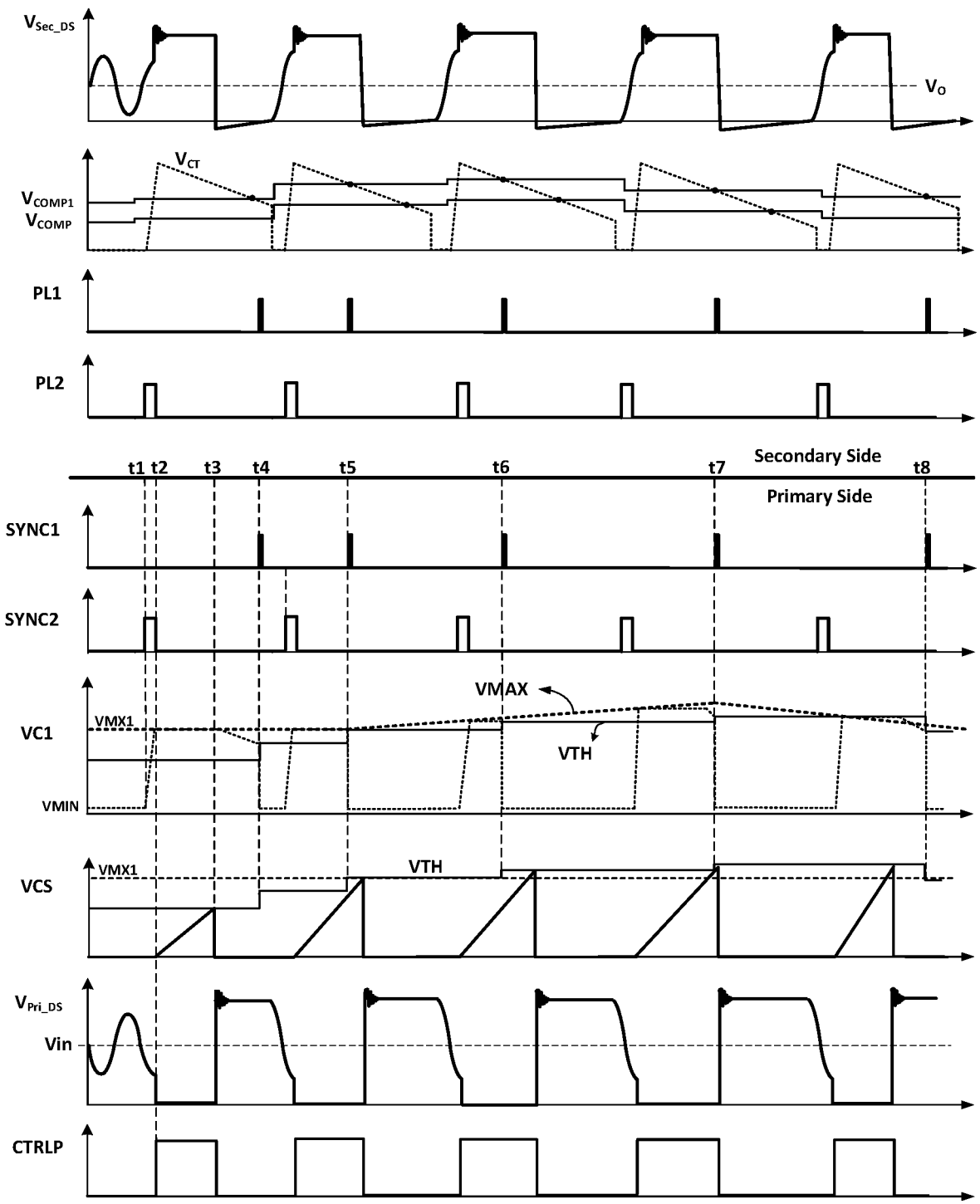
FIG. 7 shows a working waveform diagram of an isolated switching converter in accordance with an embodiment of the present invention.

FIG. 7 shows a working waveform diagram of an isolated switching converter in accordance with an embodiment of the present invention. As show in FIG. 7, at time t1, the second synchronous signal SYNC2 comes, the voltage VC1 across the capacitor C1 is set high to the upper threshold voltage VMX1. At time t2, the second synchronous signal SYNC2 comes and a resonant voltage across the primary switch 10 reaches its minimum values, i.e., valley, the primary switch 10 is turned on. At time t3, the current sense signal VCS increases to reach the peak current signal VTH, the primary switch 10 is turned off.

At time t4, the first synchronous signal SYNC1 comes, the voltage VC1 is sampled and held, and the peak current signal VTH continues to increases, but still is less than the first upper threshold VMX1.

At time t5, the turning-on of the primary switch is at the first valley, and the tine interval between the first synchronous signal SNYC1 and the second synchronous signal SYNC2 is less than the first time duration. Thus at time t5, the first synchronous signal SYNC1 comes, the upper threshold voltage VMAX is increased by the peak power control circuit 143, and the state where the upper threshold voltage VMAX is above the first upper threshold VMX1 is entered.

At time t6, the first synchronous signal SYNC1 comes, the sampled and held peak current signal VTH is higher than the first upper threshold voltage VMX1. At time t7, the time interval between the first synchronous signal SYNC1 and the second synchronous signal SYNC2 is higher than the first time duration, the first determination signal JD1 becomes low level, the upper threshold voltage VMAX is adjusted to decrease, and the state where the upper threshold voltage VMAX is above the first upper threshold VMX1 is existed. At time t8, the first synchronous signal SYNC1 comes, the sampled and held peak current signal VTH is less than the first upper threshold voltage VMX1.

Figure 8:
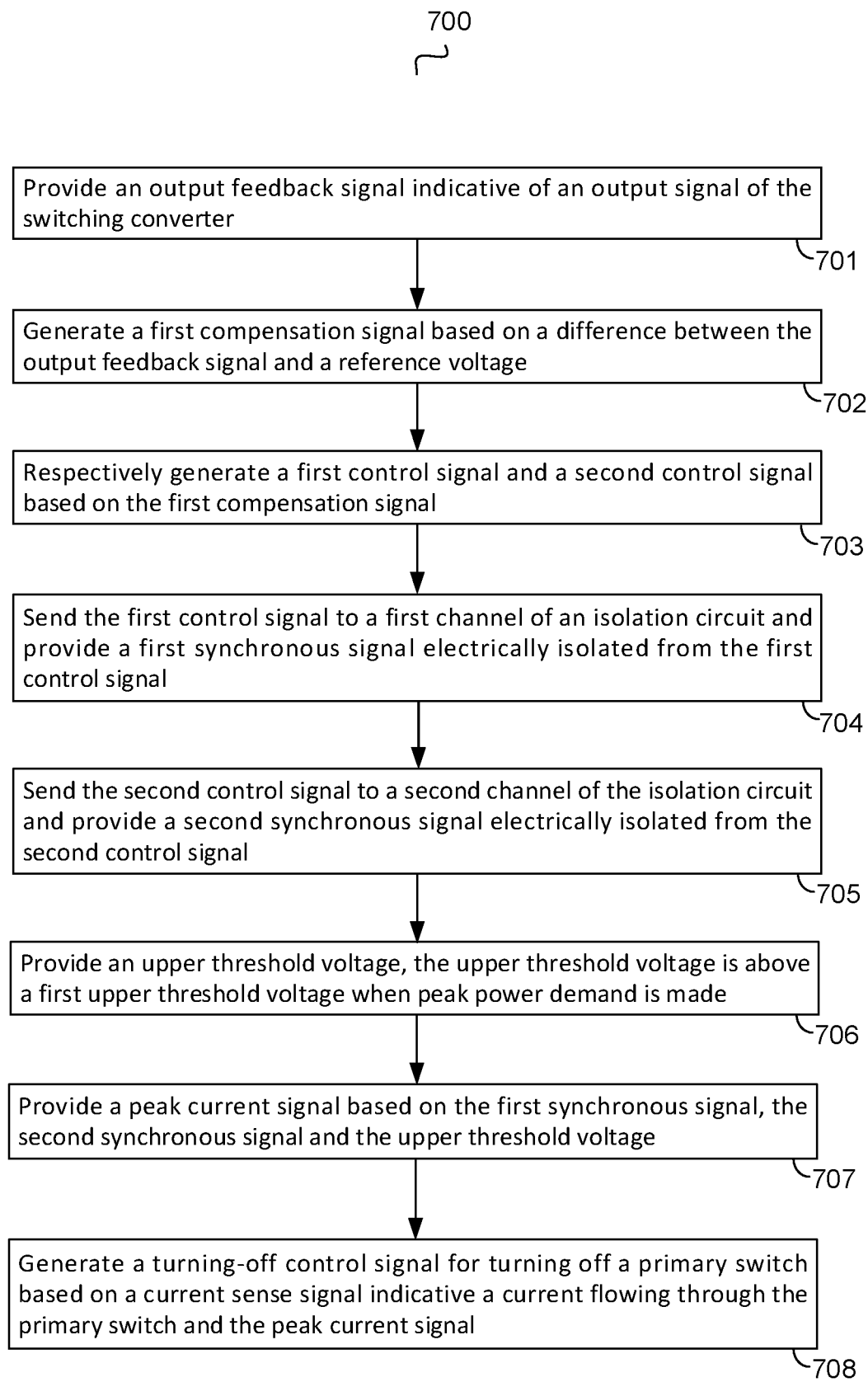
FIG. 8 shows a flow diagram of a control method 700 for an isolated switching converter in accordance with an embodiment of the present invention.

FIG. 8 shows a flow diagram of a control method 700 for an isolated switching converter in accordance with an embodiment of the present invention. The isolated switching converter has a primary switch and an isolation circuit, the control method 700 comprises steps 701-708.

At step 701, an output feedback signal is generated based on an output signal of the isolated switching converter.

At step 702, a first compensation signal is generated based on the difference between the output feedback signal and a reference voltage.

At step 703, a first control signal and a second control signal are respectively generated based on the first compensation signal. In one embodiment, the method for generating a first control signal comprises: generating a second compensation signal based on the first compensation signal; comparing the second compensation signal with a modulation signal to provide a first comparison signal; and based on the first comparison signal, providing a first control signal.

In a further embodiment, the method for generating the second control signal comprises: comparing the first compensation signal with the modulating signal to generate a second comparison signal; determining a target locked valley number based on the first comparison signal, the second comparison signal, a valley pulse signal indicative of one or more valleys of a voltage drop across a secondary switch during the OFF state of the secondary switch, and providing a second control signal corresponding to the target locked valley number.

At steps 704 and 705, the first and second control signals are respectively transmitted to a first and second channels of the isolation circuit to generate a first synchronous signal electrically isolated from the first control signal, and a second synchronous signal electrically isolated from the second control signal.

At step 706, an upper threshold voltage is provided, wherein the upper threshold voltage is above a first upper threshold voltage when a peak power demand is made and received. In one embodiment, when the time interval between the first synchronous signal and the second synchronous signal is greater than the first time duration, the upper threshold voltage is adjusted below the first upper threshold voltage. In another embodiment, when the time interval between the first synchronous signal and the second synchronous signal is less than the first time duration, the upper threshold voltage is adjusted to be equal to the first upper threshold voltage, and when the turning-on of the primary switch is locked at the first valley and the upper threshold voltage reaches the first upper threshold voltage, the upper threshold voltage is increased to be above the first upper threshold voltage.

At step 707, a peak current signal is generated based on the first synchronous signal, the second synchronous signal and the upper threshold voltage. In one embodiment, the method of generating the peak current signal comprises: a voltage across the first capacitor is set high to the upper threshold voltage when the second synchronous signal comes, then the voltage across the first capacitor is discharged to decrease; and the voltage across the first capacitor is sampled and held to provide the peak current signal based on the first synchronous signal.

At step 708, a turning-off control signal for turning-off the primary switch is generated based on a current sense signal indicative of the current flowing through the primary switch and the peak current signal. In one embodiment, the method of detecting the peak power demand comprises: a first determination signal is provided by determining whether a time interval between the first synchronous signal and the second synchronous signal is less than a first time duration, a second determination signal is provided by determining whether the primary switch is turned on at a first valley, and an enter control signal and an exit control signal are provided to determine whether to enter or exit a state where the upper threshold voltage is above the first upper threshold.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Obviously, many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A controller used in an isolated switching converter having a transformer and a primary switch, the controller comprising:

an error amplifying circuit configured to receive an output feedback signal indicative of an output signal of the isolated switching converter, wherein based on the difference between the output feedback signal and a reference voltage, the error amplifying circuit provides a first compensation signal;

a control generator configured to respectively generate a first control signal and a second control signal based on the first compensation signal;

an isolation circuit having a first channel to transmit the first control signal and a second channel to transmit the second control signal, and having a first output terminal for providing a first synchronous signal electrically isolated from the first control signal and a second output terminal for providing a second synchronous signal electrically isolated from the second control signal;

an upper threshold generator configured to provide an upper threshold voltage, wherein the upper threshold voltage is adjusted above a first upper threshold voltage when a peak power demand is made;

a peak current generator configured to provide a peak current signal at an output terminal based on the first synchronous signal, the second synchronous signal and the upper threshold voltage; and a peak comparison circuit configured to compare a current sense signal indicative of a current flowing through the primary switch with the peak current signal and to provide a turning-off control signal for turning-off the primary switch.

2. The controller of claim 1, wherein the upper threshold generator comprising:

a first determination circuit configured to provide a first determination signal by determining whether a time interval between the first synchronous signal and the second synchronous signal is less than a first time duration;

a second determination circuit configured to provide a second determination signal by determining whether the primary switch is turned on at a first valley; and a peak power control circuit configured to provide an enter control signal and an exit control signal to determine whether to enter or exit a state where the upper threshold voltage is above the first upper threshold.

3. The controller of claim 2, wherein when the time interval between the first synchronous signal and the second synchronous signal is greater than the first time duration, the upper threshold voltage is adjusted below the first upper threshold voltage.

4. The controller of claim 2, wherein:

when the time interval between the first synchronous signal and the second synchronous signal is less than the first time duration, the upper threshold voltage is adjusted to be equal to the first upper threshold voltage; and when the turning-on of the primary switch is locked at the first valley and the upper threshold voltage reaches the first upper threshold voltage, the upper threshold voltage is adjusted above the first upper threshold voltage.

5. The controller of claim 2, wherein the upper threshold generator further comprises a threshold generator, the threshold generator comprising:

a second capacitor having a first terminal and a second terminal, wherein the first terminal is configured to provide the upper threshold voltage, and the second terminal is coupled to a primary reference ground;

a second voltage source having a positive terminal, and a negative terminal coupled to the primary reference ground;

a third voltage source having a positive terminal, and a negative terminal coupled to the primary reference ground;

a first diode having an anode and a cathode, wherein the anode is coupled to the positive terminal of the second voltage source, and the cathode is coupled to the first terminal of the second capacitor;

a second diode having an anode and a cathode, wherein the anode is coupled to the first terminal of the second capacitor, and the cathode is coupled to the positive terminal of the third voltage source;

a charging control unit configured to charge the second capacitor with a charging current source based on the enter control signal; and a discharging control unit configured to discharge the second capacitor with a discharging current source based on the exit control signal.

6. The controller of claim 2, wherein the first determination circuit comprising:

a first timer circuit having an input terminal and an output terminal, wherein the input terminal is configured to receive the second synchronous signal, and based on the second synchronous signal, the first timer circuit provides a first timing signal at the output terminal;

a first flip-flop having a first input terminal, a second input terminal and an output terminal, wherein the first input terminal is configured to receive the second synchronous signal, the second input terminal is coupled to the output terminal of the first timer circuit to receive the first timing signal;

a first AND gate having a first input terminal, a second input terminal and an output terminal, wherein the first input terminal is coupled to the output terminal of the first flip-flop, and the second input terminal is configured to receive the first synchronous signal;

a second AND gate having a first inverting input terminal, a second input terminal and an output terminal, wherein the first inverting input terminal is coupled to the output terminal of the first flip-flop, the second input terminal is configured to receive the first synchronous signal; and a second flip-flop having a first input terminal, a second input terminal and an output terminal, wherein the first input terminal is coupled to the output terminal of the first AND gate, the second input terminal is coupled to the output terminal of the second AND gate, and the second flip-flop provides the first determination signal at the output terminal.

7. The controller of claim 1, wherein the peak current generator comprises a first capacitor, wherein when the second synchronous signal comes, a voltage across the first capacitor is set high to the upper threshold voltage, and starts to decrease, and when the first synchronous signal comes, the voltage across the first capacitor is sampled and held as the peak current signal.

8. The controller of claim 7, wherein the peak current generator comprising:

a second timer circuit configured to provide a second timing signal at an output terminal based on the second synchronous signal;

a third flip-flop having a first input terminal, a second input terminal, an output terminal and an inverting output terminal, wherein the first input terminal is configured to receive the second synchronous signal, the second input terminal is coupled to the output terminal of the second timer circuit to receive the second timing signal;

a first voltage source having a positive terminal, and a negative terminal coupled to the primary reference ground;

a first switch having a first terminal, a second terminal and a control terminal, wherein the first terminal is coupled to the first terminal of the first capacitor, and the second terminal is coupled to an output terminal of the upper threshold generator to receive the upper threshold voltage, and the control terminal is coupled to the output terminal of the third flip-flop;

a second switch having a first terminal, a second terminal and a control terminal, wherein the first terminal is coupled to the first terminal of the first capacitor, the second terminal is coupled to the positive terminal of the first voltage source through a first resistor, and the control terminal is coupled to the inverting output terminal of the third flip-flop; and a sample-and-hold circuit configured to provide the peak current signal by sampling and holding the voltage across the first capacitor based on the first synchronous signal.

9. An isolated switching converter, comprising:

a primary switch coupled to a primary winding of a transformer; and a controller, comprising:

an error amplifying circuit configured to receive an output feedback signal indicative of an output signal of the isolated switching converter, wherein based on the difference between the output feedback signal and a reference voltage, the error amplifying circuit provides a first compensation signal;

a control generator configured to respectively generate a first control signal and a second control signal based on the first compensation signal;

an isolation circuit having a first channel to transmit the first control signal and a second channel to transmit the second control signal, and having a first output terminal for providing a first synchronous signal electrically isolated from the first control signal and a second output terminal for providing a second synchronous signal electrically isolated from the second control signal;

an upper threshold generator configured to provide an upper threshold voltage, wherein the upper threshold voltage is adjusted above a first upper threshold voltage when a peak power demand is made;

a peak current generator configured to provide a peak current signal at an output terminal based on the first synchronous signal, the second synchronous signal and the upper threshold voltage; and a peak comparison circuit configured to compare a current sense signal indicative of a current flowing through the primary switch with the peak current signal and to provide a turning-off control signal for turning-off the primary switch.

10. The isolated switching converter of claim 9, wherein the upper threshold generator comprising:

a first determination circuit configured to provide a first determination signal by determining whether a time interval between the first synchronous signal and the second synchronous signal is less than a first time duration;

a second determination circuit configured to provide a second determination signal by determining whether the primary switch is turned on at a first valley; and a peak power control circuit configured to provide an enter control signal and an exit control signal to determine whether to enter or exit a state where the upper threshold voltage is above the first upper threshold.

11. The isolated switching converter of claim 10, wherein when the time interval between the first synchronous signal and the second synchronous signal is greater than the first time duration, the upper threshold voltage is adjusted below the first upper threshold voltage.

12. The isolated switching converter of claim 10, wherein:

when the time interval between the first synchronous signal and the second synchronous signal is less than the first time duration, the upper threshold voltage is adjusted to be equal to the first upper threshold voltage; and when the turning-on of the primary switch is locked at the first valley and the upper threshold voltage reaches the first upper threshold voltage, the upper threshold voltage is adjusted above the first upper threshold voltage.

13. The isolated switching converter of claim 10, wherein the upper threshold generator further comprises a threshold generator, the threshold generator comprising:

a second capacitor having a first terminal and a second terminal, wherein the first terminal is configured to provide the upper threshold voltage, and the second terminal is coupled to a primary reference ground;

a second voltage source having a positive terminal, and a negative terminal coupled to the primary reference ground;

a third voltage source having a positive terminal, and a negative terminal coupled to the primary reference ground;

a first diode having an anode and a cathode, wherein the anode is coupled to the positive terminal of the second voltage source, and the cathode is coupled to the first terminal of the second capacitor;

a second diode having an anode and a cathode, wherein the anode is coupled to the first terminal of the second capacitor, and the cathode is coupled to the positive terminal of the third voltage source;

a charging control unit configured to charge the second capacitor with a charging current source based on the enter control signal; and a discharging control unit configured to discharge the second capacitor with a discharging current source based on the exit control signal.

14. The isolated switching converter of claim 10, wherein the first determination circuit comprising:

a first timer circuit having an input terminal and an output terminal, wherein the input terminal is configured to receive the second synchronous signal, and based on the second synchronous signal, the first timer circuit provides a first timing signal at the output terminal;

a first flip-flop having a first input terminal, a second input terminal and an output terminal, wherein the first input terminal is configured to receive the second synchronous signal, the second input terminal is coupled to the output terminal of the first timer circuit to receive the first timing signal;

a first AND gate having a first input terminal, a second input terminal and an output terminal, wherein the first input terminal is coupled to the output terminal of the first flip-flop, and the second input terminal is configured to receive the first synchronous signal;

a second AND gate having a first inverting input terminal, a second input terminal and an output terminal, wherein the first inverting input terminal is coupled to the output terminal of the first flip-flop, the second input terminal is configured to receive the first synchronous signal; and a second flip-flop having a first input terminal, a second input terminal and an output terminal, wherein the first input terminal is coupled to the output terminal of the first AND gate, the second input terminal is coupled to the output terminal of the second AND gate, and the second flip-flop provides the first determination signal at the output terminal.

15. The isolated switching converter of claim 9, wherein the peak current generator comprises a first capacitor, wherein when the second synchronous signal comes, a voltage across the first capacitor is set high to the upper threshold voltage, and starts to decrease, and when the first synchronous signal comes, the voltage across the first capacitor is sampled and held as the peak current signal.

16. The isolated switching converter of claim 15, wherein the peak current generator comprising:
   a second timer circuit configured to provide a second timing signal at an output terminal based on the second synchronous signal;
   a third flip-flop having a first input terminal, a second input terminal, an output terminal and an inverting output terminal, wherein the first input terminal is configured to receive the second synchronous signal, the second input terminal is coupled to the output terminal of the second timer circuit to receive the second timing signal;
   a first voltage source having a positive terminal, and a negative terminal coupled to the primary reference ground;
   a first switch having a first terminal, a second terminal and a control terminal, wherein the first terminal is coupled to the first terminal of the first capacitor, and the second terminal is coupled to an output terminal of the upper threshold generator to receive the upper threshold voltage, and the control terminal is coupled to the output terminal of the third flip-flop;
   a second switch having a first terminal, a second terminal and a control terminal, wherein the first terminal is coupled to the first terminal of the first capacitor, the second terminal is coupled to the positive terminal of the first voltage source through a first resistor, and the control terminal is coupled to the inverting output terminal of the third flip-flop; and
   a sample-and-hold circuit configured to provide the peak current signal by sampling and holding the voltage across the first capacitor based on the first synchronous signal.

17. A control method used in an isolated switching converter, wherein the isolated switching converter has a primary switch and an isolation circuit, the control method comprising:
   providing an output feedback signal indicative of an output signal of the isolated switching converter;
   providing a first compensation signal based on the difference between the output feedback signal and a reference voltage;
   generating a first control signal and a second control signal based on the first compensation signal;
   transmitting the first control signal to a first channel of the isolation circuit and providing a first synchronous signal electrically isolated from the first control signal;
   transmitting the second control signal to a second channel of the isolation circuit and providing a second synchronous signal electrically isolated from the second control signal;
   providing an upper threshold voltage, wherein the upper threshold voltage is above a first upper threshold voltage when a peak power demand is made;
   generating a peak current signal based on the first synchronous signal, the second synchronous signal and the upper threshold voltage; and
   generating a turning-off control signal for turning-off the primary switch based on a current sense signal indicative of the current flowing through the primary switch and the peak current signal.

18. The control method of claim 17, wherein detecting the peak power demand comprising:
   providing a first determination signal by determining whether a time interval between the first synchronous signal and the second synchronous signal is less than a first time duration;
   providing a second determination signal by determining whether the primary switch is turned on at a first valley; and
   providing an enter control signal and an exit control signal to determine whether to enter or exit a state where the upper threshold voltage is above the first upper threshold.

19. The control method of claim 17, wherein:
   when the time interval between the first synchronous signal and the second synchronous signal is greater than the first time duration, the upper threshold voltage is adjusted below the first upper threshold voltage;
   when the time interval between the first synchronous signal and the second synchronous signal is less than the first time duration, the upper threshold voltage is adjusted to be equal to the first upper threshold voltage; and
   when the turning-on of the primary switch is locked at the first valley and the upper threshold voltage reaches the first upper threshold voltage, the upper threshold voltage is increased to be above the first upper threshold voltage.

20. The control method of claim 17, wherein generating the peak current signal comprising:
   a voltage across the first capacitor is set high to the upper threshold voltage when the second synchronous signal comes;
   discharging the first capacitor to decrease the voltage across the first capacitor; and
   the voltage across the first capacitor is sampled and held to provide the peak current signal based on the first synchronous signal.

* * * * *